United States Patent Office 3,413,806
Patented Dec. 3, 1968

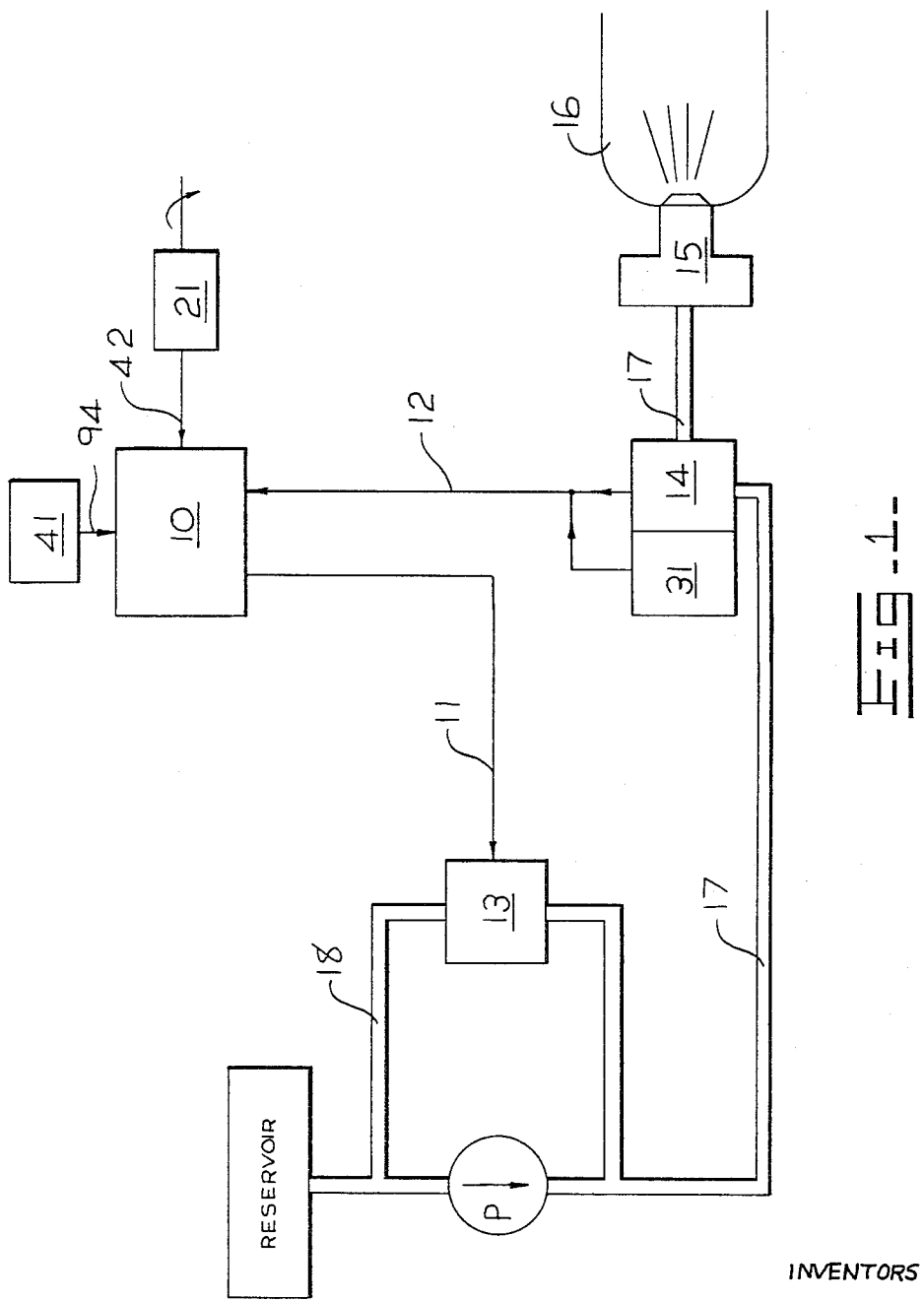

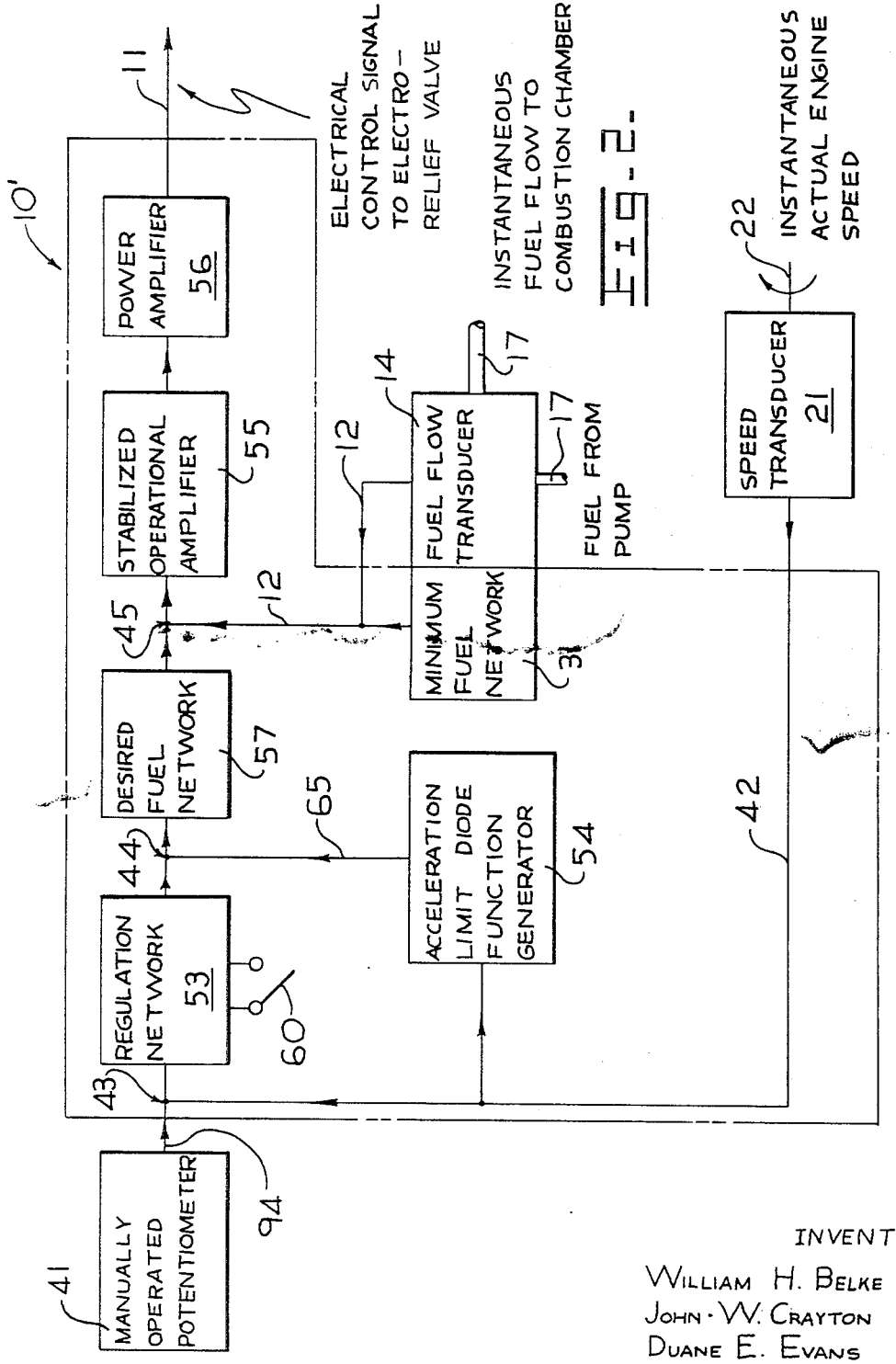

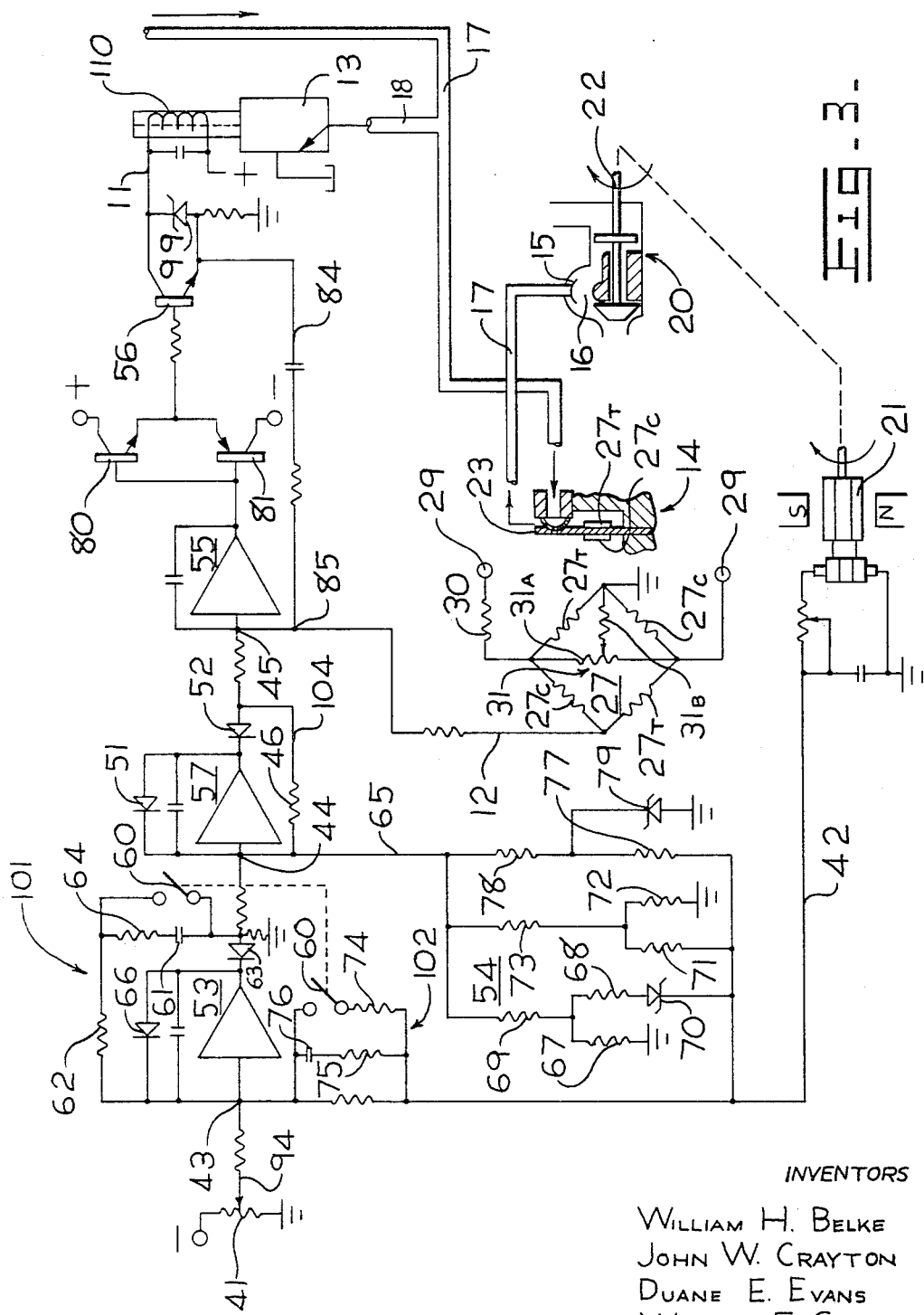

3,413,806
FUEL SYSTEM AND ELECTRICAL CONTROL THEREFOR
William H. Belke, Peoria, John W. Crayton, Washington, and Duane E. Evans and William E. Streight, Peoria, Ill., assignors to Caterpillar Tractor Co., Peoria, Ill., a corporation of California
Filed Mar. 7, 1966, Ser. No. 532,436
3 Claims. (Cl. 60—39.28)

ABSTRACT OF THE DISCLOSURE

In the fuel line to the combution chamber of a gas turbine engine is arranged a fuel bypass circuit containing an electrically controlled pressure relief valve to divert, if and as required, a variable portion of the fuel destined for the combustion chamber back to the reservoir; hence, to control the amount of fuel to the combustion chamber by regulating the fuel system pressure. The relief valve is responsive to a load signal from an electrical control which in turn is responsive to electrical input signals representative of desired engine speed, actual fuel flow to the combustion chamber and actual engine speed and provided by a manually operated potentiometer, a fuel flow transducer and a speed transducer, respectively.

---

The present invention relates generally to an engine fuel system, and more particularly to a gas turbine engine fuel system in which the amout of fuel flow to the combustion chamber is controlled by regulating the fuel system pressure with electrical control means.

It is well known to control the flow of engine fuel in a fuel supply system by mechanically or hydraulically regulating the quantity of flow by regulating the displacement of a pump or the variable diameter of a restricting orifice. These prior art fuel systems tend to operate at high pressure which requires relatively large hydraulic pumps and pressure relief valves. Moreover, the controls associated with these fuel systems are usually unreliable, mechanically operated, and lack quick response and selectivity.

The fuel system and electrical controls therefor of the present invention eliminate the disadvantages associated with the above-described prior art systems and controls. By regulating the system pressure to control fuel flow, the present invention allows the size of the hydraulic pump in the fuel supply circuit to be relatively small, and also allows a greater life expectancy for the pump. The present invention teaches a relatively low pressure system in that proper operation is achieved with pump output pressure of only 50 p.s.i.g. over the pressure at the fuel outlet nozzle in the combustion chamber.

Furthermore, by employing the electrical controls taught by the present invention the engine operator is able to select or vary the operating speed of the engine by merely manipulating a speed demand adjustment or potentiometer whereupon the control automatically adjusts the fuel flow and quickly brings about the selected speed.

It is an object of the present invention to provide a fuel system in which the fuel flow is controlled by regulation of the fuel system pressure with electrical control means.

It is another object of the present invention to provide a closed loop electrical control system which functions to produce an output or magnetizing current for operating an electrically controlled pressure relief valve, wherein the output current is determined by a voltage which is a function of, and therefore representative of, the actual instantaneous fuel flow to the engine combustion system, and by a voltage which is a function of, and therefore representative of, the desired fuel flow thereto.

It is yet another object of the present invention to provide electrical control means which act instantaneously in response to manipulation of an engine speed adjustment, forming part of the control system, to regulate the fuel flow to the precise level which will result in the engine's attaining the desired speed.

It is yet another object of the present invention to provide an electrical control system for a gas turbine engine which operates automatically to control fuel flow to a level which will prevent "flame-out" during the intervals when the engine is decelerating or starting up.

It is still another object of the present invention to provide an electrical control system having acceleration limiting means which incorporate interchangeable acceleration limit signal circuitry permitting the same electrical control to provide varied and selectable fuel flow control patterns as may be required by a particular engine.

It is yet another object of the present invention to provide an electrical control system for a gas turbine engine which allows the engine operator the choice of isochronous operation or droop operation thereof.

Still further and more specific objects and advantages of the present invention and the manner in which the invention is carried into practice are made apparent in the following specification wherein reference is made to the accompanying drawings.

In the drawings:
FIG. 1 is a schematic diagram of the fuel system of the present invention;
FIG. 2 is a block diagram of the electrical control of the present invention; and
FIG. 3 is an electrical circuit diagram of the electrical control of the present invention showing the interrelationship of the controls with the fuel system.

Referring to FIG. 1, the electrical control portion 10 which together with the minimum fuel network 31 (see FIG. 2) forms the electrical control 10' of the present invention, is electrically associated through electrical conductor 11 with an electrically controlled pressure relief valve 13 disposed in branch fuel conduit 18. The electrical control portion 10 is also electrically associated through conductors 12, 42 and 94 with an electro-mechanical fluid flow transducer 14 disposed in main fuel conduit 17, with an engine speed transducer 21 and with a manually adjustable potentiometer 41 respectively. The electrically controlled pressure relief valve may be of the type described and claimed in assignee's co-pending United States application Ser. No. 522,446, filed Jan. 24, 1966, and the electro-mechanical fluid flow transducer may be of the type described and claimed in assignee's co-pending United States patent application Ser. No. 453,004, filed May 4, 1965. An understanding of the details of neither the valve nor the transducer is required to understand the present invention.

A pump P is driven by the engine, and its fuel output is variable and dependent upon engine speed. The pump draws fuel from the reservoir and supplies it through conduit 17 to fuel nozzle 15 of combustion chamber 16.

The pressure relief valve 13 includes an electromagnet 110 (see FIG. 3), the magnetizing current for which is supplied from the electrical control 10' via conductor 11. Operatively associated with the eletro-magnet of the pressure relief valve is a movable armature which is magnetically induced to approach the core of the electromagnet, and hence to impede or substantially block the fluid communication between the high and low pressure sides of the relief valve through the core. An increase in magnetizing current from control 10' increases the magnetic force of attraction on the armature, and reduces the fuel diverted by the relief valve from the high pressure side of pump P back to its low pressure side via branch conduit 18.

Referring to FIG. 2, the electrical control 10' of the present invention is shown enclosed in broken lines. The electrical control 10' consists of the electrical control portion 10 and the minimum fuel network 31. The electrical input signals to the electrical control are provided by the fuel flow transducer, the engine speed transducer and by the manually operated potentiometer. The electrical output signal from the control is fed via conductor 11 to the electrically responsive pressure relief valve.

The fuel flow transducer provides an input signal to the control which is proportional to the instantaneous actual rate of fuel flow in main conduit 17. Similarly the speed transducer provides an input signal which is proportional to the instantaneous actual engine speed. The setting of the manually operated potentiometer may be varied by the engine operator to provide the control with an input signal which represents the desired engine speed.

In the system of the present invention it will be seen that the level of fuel flow to the combustion chamber can be regulated indirectly by an engine operator through appropriate adjustment of the speed potentiometer 41, or automatically by the electrical control itself through its feedback system. Thus, the operator himself can impose on the electrical control a signal representative of the speed which will allow the engine to operate at the desired fuel flow or the electrical control will operate automatically through its feedback system to increase or reduce the level of fuel flow sufficiently to eliminate any increase or decrease in speed above or below the speed set by the potentiometer which may result from a change in engine load.

A feature of the control of the present invention is that it includes a regulation network 53, an acceleration limit diode function generator 54, a desired fuel network 57 and a minimum fuel network 31. During engine start up and periods of engine deceleration, the electrical output of the desired fuel network is constant and the minimum fuel network 31 provides a signal which is of significantly greater magnitude than the constant output of the desired fuel network, and which prevents engine "flame-out."

The electrical control has three main summing junctions 43, 44 and 45. The input to stabilized operational amplifier 55 is the total signal at summing junction 45. This total signal is the sum of the signal from the desired fuel network which is representative of the desired fuel flow to the combustion chamber, plus the signal from the fuel flow transducer, which is representative of the instantaneous actual fuel flow to the combustion chamber. The output from the desired fuel network is a voltage which is either a function of the desired fuel or it is constant. When the output is constant, minimum fuel is provided by the minimum fuel network 31. The minimum fuel network provides a bias (to the voltage which is a function of actual fuel flow) by unbalancing the strain gage bridge 27 (see FIG. 3). The input to the desired fuel network is the total signal existing at summing junction 44. This total signal consists of the sum of the signal from the acceleration limit diode function generator 54 and the signal from the regulation network 53. The output signal from the acceleration generator is a modification of the signal from the speed transducer, and modified to conform with the overall speed fuel demand curve of the particular gas turbine engine being controlled. The input to the regulation network 53 is the total signal existing at summing junction 43. This total signal consists of the signal from the speed transducer which is proportional to and representative of the instantaneous actual engine speed, and the signal from the manually operated potentiometer, which is representative of the engine speed at which the operator wishes the engine to run.

Referring to FIG. 3, the electrical control of the present invention is associated with and biased by a regulated power supply (not shown) which may be of the type described and claimed in assignee's co-pending United States patent application Ser. No. 529,009, filed Feb. 21, 1966, now Patent No. 3,376,489.

The gasifier shaft 22 of gas turbine engine 20 drives an electro-mechanical speed transducer 21 to generate an electrical D.C. signal proportional to the instantaneous actual engine speed. The strain gaged flow transducer 14 includes a cantilevered beam 23 upon which fuel, issuing from main conduit 17, impinges. The beam carries four matched strain gages 27T and 27C. These gages are located two at each side of the beam. Consequently, as the fuel impinges upon the beam and causes the beam to move at its displaceable end, the strain gages designated 27C are compressed and the other two are put in tension.

The four matched resistances of the four strain gages 27C and 27T are electrically connected to form a strain gage bridge 27. The bridge is electrically connected to a regulated D.C. voltage supply of approximately 6.3 volts which may be taken from the above-mentioned power supply at terminals 29 through dropping resistor 30. The strain gage bridge 27 includes resistors 31a and 31b which form the minimum fuel network 31 operable to unbalance the bridge as previously described. Resistor 31a is connected between the pair of junctions of gages 27C and 27T and resistor 31b is fixedly connected at one end of the grounded junction of gages 27C and 27T and slidably connected at its other end along resistor 31a. The minimum fuel network not only gives the overall fuel flow system a further degree of adjustability and tuning, it also allows the minimum fuel to be adjusted. By appropriate unbalancing of the strain gage bridge, the minimum fuel network operates to provide the anti-flame-out signal.

The electrical control has a manually operable adjustment potentiometer 41 calibrated in relation to desired engine speed. It also has electrical feedback over conductors 12 and 42 from the strain gage fuel flow transducer 14 and the engine speed transducer 21 respectively. The fuel flow transducer provides a D.C. output voltage signal over conductor 12 which is proportional to the instantaneous actual rate of fuel flow in main fluid conduit 17.

The electrical control includes means to regulate the flow of fuel to the combustion chamber and so maintain the desired speed of the gas turbine engine. Electrically associated with the regulation network 53 are the potentiometer 41, the speed transducer 21, and the acceleration limit diode function generator 54. The electrical control also includes a desired fuel network 57, a minimum fuel network 31, a stabilized operational amplifier 55 and a power amplifier 56.

The regulation network 53 is an operational amplifier with internal feedback. The internal feedback circuit 101 includes a manually operable switch 60, which shunts a capacitor 61 and a resistor 64 serially connected to a resistor 62. Input circuit 102 includes another segment of manually operable switch 60 which parallels a resistor 74 with a resistor 75 which is serially connected to a capacitor 76. This circuit may be used to provide stabilization in both droop and isochronous operation. The input to this regulation network is the sum at the summing junction 43 of the signal from speed potentiometer 41 and the signal from the speed transducer 21. A diode 63, serially connected to the output side of the amplifier and an internal feedback diode 66 limit the output from the regulation network to signals which will reduce fuel flow. This occurs when desired speed is reached.

The acceleration limit diode function generator 54 consists of resistors 67 and 68 which, with Zener diode 70, comprise a first voltage divider network with operational amplifier input resistor 69. The acceleration limiter also consists of resistors 71 and 72 which comprise a second voltage divider network with operational amplifier input resistor 73. The acceleration limiter further includes a resistor 77 which with Zener diode 79 comprises a third voltage divider network with operational amplifier input resistor 78. In the first network, one end of resistor 67 is grounded and the other end is connected to the junction of resistors 68 and 69. The input side of resistor 68 is connected to Zener diode 70 which is further connected to conductor 42. The second network is connected in parallel with the first network. One end of resistor 72 is grounded and the other end is connected to the junction of resistors 71 and 73. The input side of resistor 71 is connected to line 42 and the output side of resistor 73 is connected to the output side of resistor 69.

The Zener diode 70 prevents the first network from becoming operative below a voltage which corresponds to the breakdown or reference voltage of the Zener diode. The Zener diode 79 clamps the voltage of the operational amplifier input resistor 78 at the breakdown voltage of the Zener diode. It is the purpose of these networks to tap the output voltage from the speed transducer 21, to modify it, and to feed the modified voltage to summing junction 44 via conductor 65. When the tapped voltage from conductor 42 is below the breakdown voltage of Zener diodes 70 and 79, the second network and resistors 77 and 78 are responsible for the magnitude of the voltage fed back to summing junction 44. When the tappped voltage from conductor 42 is equal to or above the breakdown voltage of each of the diodes individually, the diode networks operate in parallel with the second network, and together they determine the magnitude of the feedback voltage to summing junction 44. In this way the character of the output voltage curve of the accelerator generator is linear and at a first predetermined slope when the tapped voltage from conductor 42 is below the breakdown voltages of Zener diodes 70 and 79, and linear and at a different predetermined slope when each of the diodes conduct. Since a gas turbine engine's fuel requirement usually varies directly with its speed at low speeds, and usually varies non-linearly with its speed at higher speeds, the non-linear overall engine fuel requirement curve for all engine speeds can be approximated and efficiently matched with the overall voltage output curve from acceleration generator 54 by changing the components of the voltage divider networks. It is seen, therefore, that the acceleration generator 54, in conjunction with regulation network 53, insures that the engine will receive an amount of fuel which will allow the engine to maintain or attain a given speed.

The desired fuel network 57 consists of an operational amplifier with internal feedback. The internal feedback circuit 104 includes a resistor 46 which gives the network a proportional gain. A diode 52, serially connected to the output side of the amplifier, and an internal feedback diode 51 limit the output from the network. The signal which represents minimum fuel is determined by minimum fuel network 31 which adjusts the balance of the strain gage bridge 27.

The stabilized operational amplifier stage 55 includes transistors 80 and 81 which together act as a conventional current booster. The sum of the input voltages at summing junction 45 is amplified in a conventional manner in the operational amplifier stage. Its output current is boosted and fed to the power amplifier 56 the base of which is reisistance coupled to the junction of the emitters of the operational amplifier stage. The emitter of the power transistor 56 is resistance-capacitance coupled through feedback loop 84 to junction 85 where its degenerative feedback signal is summed with the output signal from strain gage fuel flow transducer 14. Feedback loop 84 provides a proportional plus integral current feedback system for stabilization purposes. A Zener diode 99 is placed between the collector and emitter of power amplifier 56 to prevent damage thereto from any possible back inductive current from the coil of electromagnet 110.

The power amplifier operates as a proportional electronic switch. The current in its collector-emitter circuit is proportional to the signal applied to its base. Conduction in the power amplifier section 56 causes a power supply voltage to be incorporated into the circuit of the coil of the electromagnet 110. Hence the coil of the electro-magnet is provided with a varying magnetizing current which corresponds to the varying amounts of pressure regulaton required by the electro-relief valve 13 at any instant to divert an amount of fuel back to the low pressure side of pump P that will result in having main conduit 17 carry a precise amount of fuel which will suffice to allow the engine to maintain or attain a given speed, at a given load.

Thus, the magnitude of the magnetizing current directed to the coil of the electro-magnet from the electrical control 10' for a given engine load is determined by the sum, at summing junction 45, of the D.C. output from the desired fuel network which represents the desired fuel flow to the combustion chamber 16, and of the D.C. output from strain gage fuel flow transducer 14 which represents the actual instantaneous fuel flow to the combustion chamber. The output of the desired fuel network 57 is determined by the sum of the signals from the acceleration generator 54 and the regulation network 53.

By means of switch 60 of the regulation network the engine operator can choose the type of operation of the electrical control. With the switch open as shown in FIG. 3, the internal feedback over feedback loop 101 is proportional plus integral, and the operation of the electrical control is isochronous. When the switch is closed, the feedback is proportional and the electrical control means has a droop operation.

Since the fuel pump P is driven by the engine, the cranking of the engine during start up causes the pump to deliver sufficient fuel for ignition purposes.

We claim:
1. A fuel flow control system for controlling the flow of fuel to the combustion chamber of a gas turbine engine from a fuel source comprising in combination:
   a conduit hydraulically connecting the source with the combustion chamber;
   a pump disposed in said conduit and operable to supply the combustion chamber with fuel under pressure from the source;
   an electro-mechanical fuel flow transducer hydraulically disposed in said conduit and operative to provide an electrical output signal proportional to the fuel flow therethrough;
   an electrically controlled pressure relief valve hydraulically associated with said conduit between said pump and said transducer and operable in response to a control signal to divert a variable portion of the fuel from said pump away from the combustion chamber;
   electrical control means associated with the engine, said relief valve and said flow transducer and including: a regulation network comprising operational amplifier and internal feedback means and a switch, said switch operable to assume a first position which renders the operation of said control isochronous and a second position which causes said control to have a droop operation, and responsive to the sum of a first input signal, which is proportional to desired engine speed, and a first function of third input signal, which is proportional to the instantaneous actual engine speed, to provide a first output signal; an acceleration limit diode function generator consisting of a plurality of voltage divider networks, the character of the output voltage curve from which approximates the character of the fuel requirement for a gas turbine engine, electrically associated with said regulation network, and responsive to a second function of said third input signal to provide a second output signal; a desired fuel network comprising operational amplifier and internal feedback means disposed to receive said first and said second output signal and responsive thereto to produce a third out- put signal, said last-named signal being a constant during periods of engine start-up and deceleration and being a function of required fuel flow otherwise; a minimum fuel network electrically associated with said desired fuel network comprising electrical bridge unbalancing means operable to bias said output signal from said transducer, which is hereinafter referred to as the second input signal, and which is proportional to the instantaneous actual fuel flow to the combustion chamber, to provide a fourth output signal; stabilized operational amplifier means including current booster means disposed to receive said third and said fourth output signals and responsive thereto to provide a fifth output signal and wherein said fourth output signal is responsible during periods of engine start-up and deceleration to provide said stabilized operational amplifier means with an anti-flame-out signal; power amplification means electrically associated with said stabilized operational amplifier means, disposed to receive said fifth output signal, and responsive thereto to provide said control signal to operate said relief valve.

2. An electrical control circuit for controlling fuel flow to the combustion chamber of a gas turbine engine and responsive to a first input signal which is proportional to desired engine speed, to a second input signal which is proportional to the instantaneous actual fuel flow to the combustion chamber, and to a third input signal which is proportional to the instantaneous actual engine speed in order to produce a control signal for an electrically response hydraulic pressure relief valve disposed in the hydraulic fuel system of the engine, the circuit comprising in combination: a regulation network including an operational amplifier with internal feedback and manually operable switch means, said regulation network being electrically disposed to receive the sum of the first signal and a first function of the third signal, and wherein manipulation of the switch means causes the electrical control circuit to change from isochronous operation to droop operation; an acceleration limit diode function generator, the output signal from which is added to the output signal from said regulation network and the input to which is a second function of the third signal; a desired fuel network comprising an operational amplifier with internal feedback and electrically disposed to receive the sum of the output signals from said regulation network and said acceleration limit diode function generator and having an output signal which is a function of the desired fuel flow during periods when the gas turbine engine is operating other than at engine start-up and deceleration and having a constant output signal during engine start-up and deceleration; a minimum fuel network electrically disposed to bias the second input signal and having an output signal which is added to the output signal from said desired fuel network; and electrical amplification means electrically disposed to receive the sum of the second input signal as biased by said minimum fuel network and the output signal from said desired fuel network, and having an output signal which is the control signal for the relief valve.

3. The electrical control circuit of claim 2 wherein said acceleration limit diode function generator consists of a plurality of voltage divider networks, the character of the output voltage curve from which approximates the character of the fuel requirement curve for the gas turbine engine.

References Cited

UNITED STATES PATENTS

| | | | |
|---|---|---|---|
| 2,851,855 | 9/1958 | Gamble | 60—39.28 |
| 3,006,144 | 10/1961 | Arnett et al. | 60—39.28 |
| 2,688,841 | 9/1954 | Decher et al. | 60—39.28 |
| 2,720,752 | 10/1955 | Chandler et al. | 60—39.28 |
| 3,128,603 | 4/1964 | Haigh | 60—39.28 |

JULIUS E. WEST, *Primary Examiner.*

UNITED STATES PATENT OFFICE
CERTIFICATE OF CORRECTION

Patent No. 3,413,806                              December 3, 1968

William H. Belke et al.

It is certified that error appears in the above identified patent and that said Letters Patent are hereby corrected as shown below:

Column 1, line 13, "combution" should read -- combustion --. Column 2, line 62, "eletro-magnet" should read -- electro-magnet --. Column 4, line 14, after "two" insert -- 27T --. Column 5, line 23, "tappped" should read -- tapped --. Column 7, line 31, "response" should read -- responsive --.

Signed and sealed this 31st day of March 1970.

(SEAL)
Attest:

Edward M. Fletcher, Jr.                        WILLIAM E. SCHUYLER, JR.
Attesting Officer                                Commissioner of Patents